United States Patent
Stewart (10) Patent No.: US 6,546,257 B1
(45) Date of Patent: Apr. 8, 2003

(54) PROVIDING PROMOTIONAL MATERIAL BASED ON REPEATED TRAVEL PATTERNS

(76) Inventor: Kavin K. Stewart, 6282 Camino del Lago, Pleasanton, CA (US) 94566

( * ) Notice: Subject to any disclaimer, the term of this patent is extended or adjusted under 35 U.S.C. 154(b) by 0 days.

(21) Appl. No.: 09/494,811

(22) Filed: Jan. 31, 2000

(51) Int. Cl.[7] .................................................. H04Q 7/20
(52) U.S. Cl. ........................ 455/456; 455/461; 455/466; 340/988; 340/991; 701/201; 701/207
(58) Field of Search ................................ 455/456, 457, 455/461, 466; 340/988–996; 701/201–217

(56) References Cited

U.S. PATENT DOCUMENTS

| 5,508,707 A | | 4/1996 | LeBlanc et al. ............. 342/457 |
| 5,570,412 A | | 10/1996 | LeBlanc et al. .............. 379/58 |
| 5,596,500 A | | 1/1997 | Sprague et al. .......... 364/499.7 |
| 5,768,686 A | | 6/1998 | LeBlanc et al. ............ 455/31.1 |
| 5,797,134 A | | 8/1998 | McMillan et al. .......... 705/400 |
| 5,948,040 A | | 9/1999 | DeLorme et al. ........... 701/201 |
| 6,026,304 A | * | 2/2000 | Hilsenrath et al. .......... 455/456 |
| 6,049,718 A | * | 4/2000 | Stewart ...................... 455/456 |
| 6,208,866 B1 | * | 3/2001 | Rouhollahzadeh et al. . 455/456 |

* cited by examiner

Primary Examiner—Thanh Cong Le
Assistant Examiner—Tuan Tran (57) ABSTRACT

A method of providing geographically sensitive promotional information to a predefined location associated with a mobile unit having a transmitter which can transmit position location information, and an apparatus for executing such a method. The method includes receiving from the mobile unit, at least one transmission which provides information on multiple locations of the mobile unit over a span of time, and an identification of the mobile unit. Multiple locations of the mobile unit are determined from the received transmissions, and a repeated travel pattern of the mobile unit determined based on the multiple locations. From a database of locations associated with respective promotional identifications or information, a promotional identification or information is retrieved which is associated with a location which is within a predetermined position relative to the repeated travel pattern. The promotional identification or promotion information based on the promotional identification, is provided to the predefined location.

15 Claims, 5 Drawing Sheets

PROVIDING PROMOTIONAL MATERIAL BASED ON REPEATED TRAVEL PATTERNS

FIELD OF THE INVENTION

This invention relates to determining the location of a mobile unit, such as a portable telephone, and evaluating a travel pattern as a function of related locations or at least one location as a function of time, and providing geographically relevant information based on the evaluation.

BACKGROUND OF THE INVENTION

Portable telephones, particularly in the form of current cellular telephones, are well known. In addition, several companies have disclosed and are proceeding with plans for a network of low-orbiting satellites which will allow communication from portable telephones from almost anywhere in the world, without relying on the multiple call regions or "cells" in a cellular telephone system. Portable devices which allow a user to determine their location particularly based on various satellite positioning systems, are also now known. Such systems are generally referred to as Global Positioning Systems ("GPS"). These systems use signals from a series of satellites which allow a portable receiver (i.e. a GPS receiver) on earth to determine its position with a fairly high degree of accuracy.

It has also been known to provide user's of portable location devices with geographically relevant information based on the user's current location. In particular, U.S. Pat. No. 5,948,040 provides travelers having a portable location device with information concerning their immediate needs for travel information or arrangements (for example: reservations and/or entitlement to a discount for the next meal at a roadside eating place or lodgings for the night ahead; current information about goods/services available nearby and/or up ahead along the user's intended or predicted route of travel). Such information is obviously helpful to travelers and has the potential to bring in one-time customers who happen to be passing near a merchant of goods or services (such as hotels, restaurants, and the like).

The invention of the present application realizes that merchants would like to be able to identify potential customers who :might frequently repeatedly be in a particular geographic situation (such as repeatedly traveling near the same business while commuting to and from work). This would enable a number of advantages. For example, merchants could offer special incentives such as volume discounts to such potential customers. Further, it would be worthwhile to invest advertising money to repeatedly target such potential customers with advertising in the hope that over time, they would avail themselves of the merchant's business. Also, since such a potential customer is in the same particular geographic situation, there is an increased chance for an impulse purchase if they have been repeatedly targeted with advertising. For example, it would be worthwhile to known that an individual commutes to and from work past a coffee shop in the morning so as to repeatedly target that individual with advertising relating to that coffee shop. It would also be desirable if any means for tracking an individual's repeated travel patterns was relatively simple and did not facilitate overly intrusive tracking of an individual's location.

SUMMARY OF THE INVENTION

The present invention then, provides in one aspect a method of providing geographically relevant promotional information to a predefined location associated with a mobile unit having a transmitter. This aspect may typically be executed at a central base station. The method includes receiving from the mobile unit, at least one transmission which provides information on multiple locations of the mobile unit over a span of time, and an identification of the mobile unit. For example, multiple transmissions which do not themselves carry location information may be received and locations determined by triangulation. Alternatively, the received multiple transmissions may actually carry location information themselves, or a single transmission could be received which carries the multiple location information (such as recorded at the mobile unit over time, then transmitted together). A repeated travel pattern of the mobile unit is determined based on the multiple locations. A promotional identification or information is retrieved from a database of such identifications or information, and provided to the predefined location based at least in part, on the repeated travel pattern. For example, when the repeated travel pattern exhibits an attribute of a predetermined rule associated with a particular promotional identification or information that promotional identification or information is retrieved. Such predetermined rule may, for example, be provided to the database in association with the promotional identification or information. An example of such a rule may be any portable unit user who repeatedly is within a specified distance of a specified location within a specified time frame, or not at a specified location within a specified time frame. In a particular aspect, a promotional identification or information which is associated with a location which is within a predetermined position relative to the repeated travel pattern, is retrieved from a database of locations associated with respective promotional identifications. The retrieved promotional identification or promotion information based on the promotional identification, is provided to the location.

The received transmissions from the mobile unit may carry the location information (for example, as a result of the mobile unit having a position locator which provides such information), or the location information can be determined by some other means based on the received signal (for example, by triangulation). As to the predefined location, this can be any location such as the mobile unit operator's residence or stationary telephone number, or the mobile unit itself. In the case of the residential address, the promotional identification or information can be, for example, printed material which is mailed or otherwise delivered to the operator's residence. In the case where the predefined location is the mobile unit itself, the promotional identification or information can be, for example, information transmitted to the mobile unit (when the mobile unit also includes a receiver). Other predefined locations are possible (such as the identification of a different mobile unit, for example, a portable computer).

The promotional identification or information can be provided to the predefined location based solely on the determined travel pattern or such travel pattern and additional criteria. For example, the promotional identification or information may be actually provided to the mobile unit in response to a received location information transmission indicating the mobile unit is within a predetermined position relative to the location associated with the promotional identification. This can be used, for example, when it is known from the pattern that an operator passes near a given merchant every day, but the merchant has decided that the most effective advertising in that situation would best be delivered every day as the operator passes near the business.

An alternative criterion additionally involves receiving from the mobile unit, further multiple location information transmissions over a span of time and an identification of the mobile unit. Form such received additional location information it may be determined that the mobile unit is in the process of currently repeating the previously identified travel pattern, following which the promotional identification or information is transmitted to the mobile unit. When the determined travel pattern has been coordinated with respect to time, this can also be used as a criterion on which to determine when to provide particular promotional identification or information. For example, when it has previously been determined that the operator leaves his residence every day about the same time to go to work, this may be a good time to transmit certain types of promotional information to the operator at the mobile unit. To identify which type of promotional information to send to the mobile unit at a given time, reference may be made to the previously mentioned database when the promotional identifications in the database are also associated with respective time features. The promotional identification may be retrieved additionally based on an overlap of a time feature of the determined travel pattern and the time feature associated with the promotional identification (for example, the times features can be overlapping time ranges or can be particular times which are the same.

Alternatively to the foregoing, promotional identification or information can be provided to the predefined location based on criteria which may not include the determined travel pattern. For example, when the travel pattern has been determined a corresponding time feature for at least one portion of the repeated travel pattern may also be determined. As above, the time feature may be an absolute or relative time, or can be a fixed time or a time range. A promotional identification can be retrieved from a database of time features associated with respective promotional identifications, which is associated with a time feature which overlaps the determined time feature of the repeated travel pattern. Such an approach is useful where, for example, a merchant only wants to know where the operator is not located at a given time (for example, the operator is not home every morning).

The present invention also provides a mobile unit which can transmit multiple location information. Such a mobile telephone includes a position locator which can determine the location of the mobile telephone and generate a corresponding location signal, and a transmitter. The mobile telephone optionally also includes a processor which causes multiple determined locations of the mobile telephone to be transmitted in accordance with a predetermined rule. For example, the multiple locations are transmitted or saved into a memory on the telephone for later transmission, at preselected time periods (for example, a time period within a day for each of multiple preselected days) or only when a predetermined variation in location has been sensed by the position locator. In the case where such multiple location information is saved into the memory, the processor may cause the information to be transmitted at a predetermined fixed or relative time, or this may be done manually by an operator at their convenience.

The foregoing mobile unit may particularly be a mobile telephone which in addition to a transmitter may also include a receiver which receives an incoming call signal. In this case, a user interface may be provided which has an audio or visual user output device which can reproduce audio or visual information in an incoming call signal as a corresponding audio or visual display. The user interface also includes an audio or visual user input device which generates an audio or visual output signal corresponding to live audio or visual input, and may optionally further include a keypad or other device (for example, touch sensitive screen) by which a user's instructions (including selection of options or numbers) can be entered into the mobile telephone. The transmitter in such a mobile telephone then, is capable of transmitting the audio output signal.

A mobile telephone is also provided by the present invention which screens location requests based on predetermined requirements. In particular, such a mobile telephone is capable of a background location transmission response. Such a mobile telephone may include a position locator, a receiver, and a user interface as previously described. An alert generator, in response to a received incoming call signal, generates a first physical characteristic to indicate an incoming call to a user of the mobile telephone (for example, a typical phone "ringing" sound). A location request detector, in response to a received location request signal, can direct the location request signal to the position locator without activating the alert generator. A transmitter transmits a location signal generated by the position locator in response to a received location request signal, and also transmits the audio output signal. A processor allows a location signal to be transmitted only if the incoming location request signal meets at least one predetermined requirement. For example, the incoming location request signal carries an identification such as a calling telephone number identification corresponding to a preselected identification which might be selected through the user interface, such as a keypad. Other alternative or additional predetermined requirements may include a predetermined time range (for example, when an operator only wishes his location to be revealed between 6 AM and 8 PM).

An apparatus which may be the base station, is also provided by the present invention. Such an apparatus includes the receiver, a processor to execute the steps of a method at the base station, and a database of locations associated with respective promotional identifications. A printer may also be included and when the predefined location is a fixed location, the promotional identification or information is printed by the printer. Alternatively or additionally, the base station may include a transmitter, and the predefined location may be the location of the mobile unit with the promotional identification or information being transmitted by the transmitter to the mobile unit.

The present invention further provides a method which can be executed at a mobile telephone as described above. The method includes determining multiple locations of the mobile telephone under control of a processor in accordance with a predetermined rule, such as at preselected times or location variations, and generating corresponding location signals (or alternatively, continuously). These multiple location signals can then be transmitted (for example, to the base station). Such transmissions can occur as the location information is acquired, or the locations signals can be saved in a memory and transmitted at a later time. In the case where the location signals are saved, they can be later transmitted in response to a user command, a command from a remote location (such as from the base station), or under control of the processor in accordance with a predetermined rule.

An additional aspect of a method of the present invention provides a method for use with a mobile telephone having a user interface such as described above. This aspect may include comparing location request signals against at least one predetermined criterion, and transmitting from the mobile telephone location signals carrying location information on the mobile telephone in response to only those location request signals which meet at least one predetermined criterion. The predetermined criterion may be, for example, an identification (such as a caller ID or a code provided by a location requester) carried by the incoming location request signal being within a list of one or more predetermined identifications. The comparing can be performed at various locations, such as on the mobile telephone (in which case the predetermined criteria can be entered into the mobile telephone by the user through the user interface) or at a central station (in which case the predetermined criteria can previously have been entered into the mobile telephone by the user through the user interface, and transmitted to the central station for storage in a memory there).

It will be appreciated that the apparatus and methods of the present invention can be, or be used with, other than a mobile telephone. Accordingly, a "mobile telephone" can be replaced in any of the descriptions throughout this application, with "mobile unit". For example, any mobile unit which provides some means of locating it and some means of providing that information to a base station, can be used. Such another mobile unit may include, for example, one which has: a user interface (such as a portable computer) or does not have a user interface (such as a very simple pager receiver). The locating means to provide multiple locations over time may, for example, may simply be a transmitter where the base station has some apparatus, such as multiple receivers to provide triangulation, to determine location from a received transmission. However, a location detector on the mobile unit is preferred since methods such as triangulation, tend to be difficult to implement in practice with many mobile units such as mobile telephones. The means of providing that location information may be a transmitter, which functions as previously described. However, particularly where the multiple locations are saved in a memory on the mobile unit, such means may be an interface (for example, a modem or network circuit and port) which allows the mobile unit device to communicate such information to a base station. Alternatively, particularly where the memory is removable it may simply be physically transported (such as by mailing or a user dropping it off there) to the base station for retrieval of the multiple location data.

The present invention may provide any one or more of the following or other advantages. Merchants are able to identify potential customers who might frequently repeatedly be in a particular geographic situation (such as repeatedly passing near the merchant's business while commuting to work every day). An individual's repeated travel patterns can be tracked in a relatively simple manner that does not facilitate overly intrusive tracking of an individual's location.

DRAWINGS

Embodiments of the invention will now be described with reference to the drawings, in which.

The same reference numbers have been used in the different FIGS. to represent corresponding elements, where practical.

Embodiments of the Invention

In the present application, by one item being "remote" from another is referenced that the two items are at least in different buildings, and may be at least one, five, ten, one hundred or one thousand miles apart. By a "processor" in the present application includes a general purpose processor (such as a digital processor) suitably programmed to carry out the functions required by it, or functionally equivalent hardware and/or software combinations. A "memory" references any device on which machine accessible data can be stored, for example a magnetic storage media such as magnetic disc (such as a floppy disc) or magnetic tape; optical storage media such as optical disc, optical tape, solid state electronic storage devices such as random access memory (RAM), or read only memory (ROM). Such memory may or may not be removable (that is, reversibly taken in an out from the apparatus which reads it without requiring repairs to that apparatus or memory, and preferably by hand without the need for tools). A "telephone" of a mobile telephone includes an audio and/or video receiver and an audio and/or video transmitter. A "mobile unit" references any mobile device. Such mobile devices may, for example, either be a component of a propelled apparatus (such as a self-propelled apparatus, such as an automobile) or may be portable. A "portable" unit is one which can be readily carried by an individual and typically weighs, for example, less than 10 pounds in weight, and often less than 5 or even 2 pounds, and currently even less than 1 pounds (including a battery usually housed within the unit, which typically weighs less than 2 or 1 pounds, or currently less than 0.5 pounds). "Promotional material" includes any descriptive material provided by a merchant or another for provision to third parties, such as material describing or promoting a service or product (although it need not relate to a product or service but could, for example, be a public service type of material).

Figure 1:
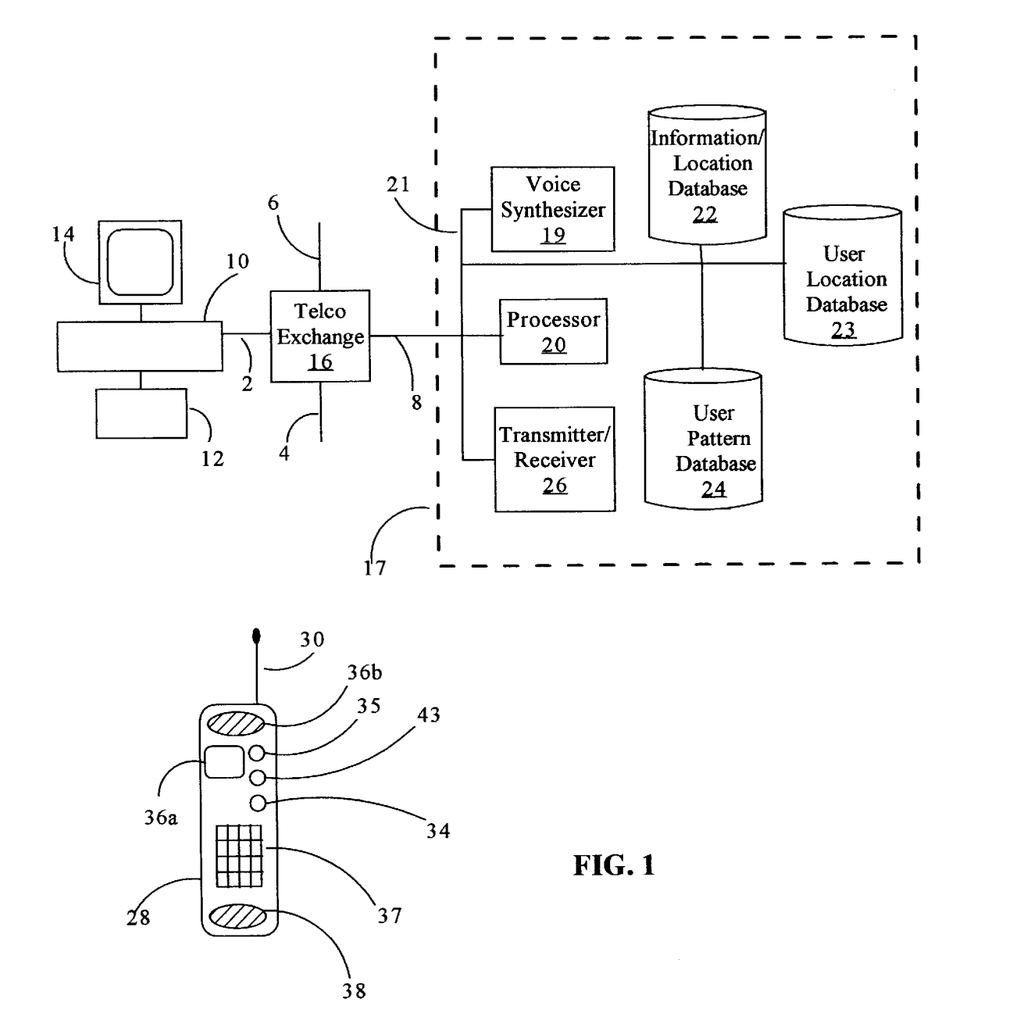
FIG. 1 schematically illustrates an apparatus of the present invention in the form of a centralized base station (which is shown in communication with a merchant) and a portable telephone of the present invention, both of which can execute a method of the present invention.

Referring first to FIG. 1, a base station 17 of the present invention is shown in communication over a line 8, telephone exchange 16 and line 2 with a remote merchant station which includes a computer 10, display 14 and user interface in the form of keyboard 12. Other lines 4 and 6 allow other remote merchant stations to communicate with network router 16 and hence with base station 17. Lines 2, 4, 6, 8 and exchange 16 form a first network through which multiple merchant stations can communicate with centralized base station 17. It will be understood that one or more of lines 2, 4, 6, or 8 could instead be wireless connections in whole or in part, such as radio or satellite connections. For example, the merchant station could itself could be a portable telephone or other suitable portable unit (such as a portable computer with wireless modem) which can receive and transmit merchant business information and location to base station 17. Each of the multiple merchant stations can provide a unique merchant identification code from its computer 10 (which may, for example, have been previously assigned by base station 17). Alternatively, any particular remote merchant station communicating with the router 16 may in some cases be identified by its connection to router 16. This is particularly true in the case where line 2 is a telephone line and router 16 is a telephone exchange, in which case a caller identification code ("caller ID code"), in the form of a first network address (e.g. the telephone number of that phone) is added to a calling signal routed through router 16. For the sake of simplicity only one router 16 is shown between first phone 10 and centralized base station 17, but others could be present. Note that in this case also, base station 17 may have its own caller ID.

Centralized base station 17 includes a processor 20 which is connected to a bus 21 as is a transmitter/receiver ("transceiver") 26, voice synthesizer 19, and three databases in the form of information/location database 22, user location database 23 and user pattern database 24. While for ease of reference these are illustrated in FIG. 1 as being saved in respective memories, it will be appreciated that these databases can be saved within any combination of one or more memory devices. Information/location database 22 stores information on merchants in association with their geographical location (for example, in the form of an address or latitude and longitude coordinates). User location database 23 stores information on multiple locations over a span of time in association with the identifications of respective portable telephones or other mobile units. User pattern database 24 stores information on repeated travel patterns of mobile units in association with respective unit identifications. The data stored in databases 22, 23, and 24 is generated as described below. Bases station 17 further includes a transceiver 26 which allows it to communicate with multiple mobile units, such as portable telephone 28. Processor 20 is programmed to execute the steps required of it, as described further below.

A mobile unit may take the form of a mobile telephone, for example the portable telephone 28 shown in FIGS. 1. The components of a portable unit such as that in FIGS. 1 and 2 may be the same as described in detail in allowed U.S. Patent Application entitled "Telephone System and Method with Background Location Response Capability", Ser. No. 08/902,090 filed Jul. 29, 1997, which is incorporated herein by reference. However, processor 32 will be suitably programmed to at least carry out the functions required by the present invention. While such a portable telephone will now be described, it will be understood that other mobile units of similar construction could be used instead which may, for example, have one or more features of the user interface (for example, a portable computer).

Portable telephone 28 has a housing 29 within which are provided the necessary to electronics, as well as a power supply compartment to hold a battery. Such telephones, including battery are typically less than 10 pounds in weight, and often less than 5 or even 2 pounds, and currently even less than 1 pounds. The battery itself is usually less than 2 or 1 pounds, or currently less than 0.5 pounds. Further, they are usually less than 6 inches by 3 inches in length and width and less than 1 inch in thickness. Portable telephone 28 also has an audio input device 38 in the form of a microphone, a keypad 37 similar in operation to keypad 14 of first telephone 10, and an audio-visual display device 36 which includes an audio output in the f6rm of earphone 36b and liquid crystal display ("LCD display") 36a. An antenna 30 allows transmission and reception with remote locations such as centralized base station 17, and also receives signals for a GPS location detector 40. A user call alert 34 in the form of small speaker and associated driver circuitry, provides a user with a first physical characteristic in the form of an audible first alert indicating an incoming call signal. A user location alert 35 in the form of a light (such as an LED) and associated circuitry, is illuminated by processor 32 to provide a user with a second physical characteristic preferably different from the first physical characteristic, for example in the form of a visible indication of an incoming location request signal, and remains illuminated while a location request is being processed and transmitted. Alternatively, user location alert 35 could be a vibrator which alerts a user by means of a vibration of portable phone 28 when it is near the user's body. By a user entering an appropriate sequence of characters on keypad 37 (such as "###") the keypad 37 can also act as a bypass switch 42 which in one position causes an incoming location request signal to not only illuminate the light of user location alert 35, but also causes call alert 34 to sound. Re-entry of the same character sequence on keypad 37 causes bypass switch 42 to return to its normal setting in which an incoming location request signal activates only the light of user location alert 35, and not the audible alarm provided by the speaker of user call alert 34. An alert switch indicator 43, in the form another LED ("light emitting diode") indicates which position bypass switch 42 is in.

Figure 2:
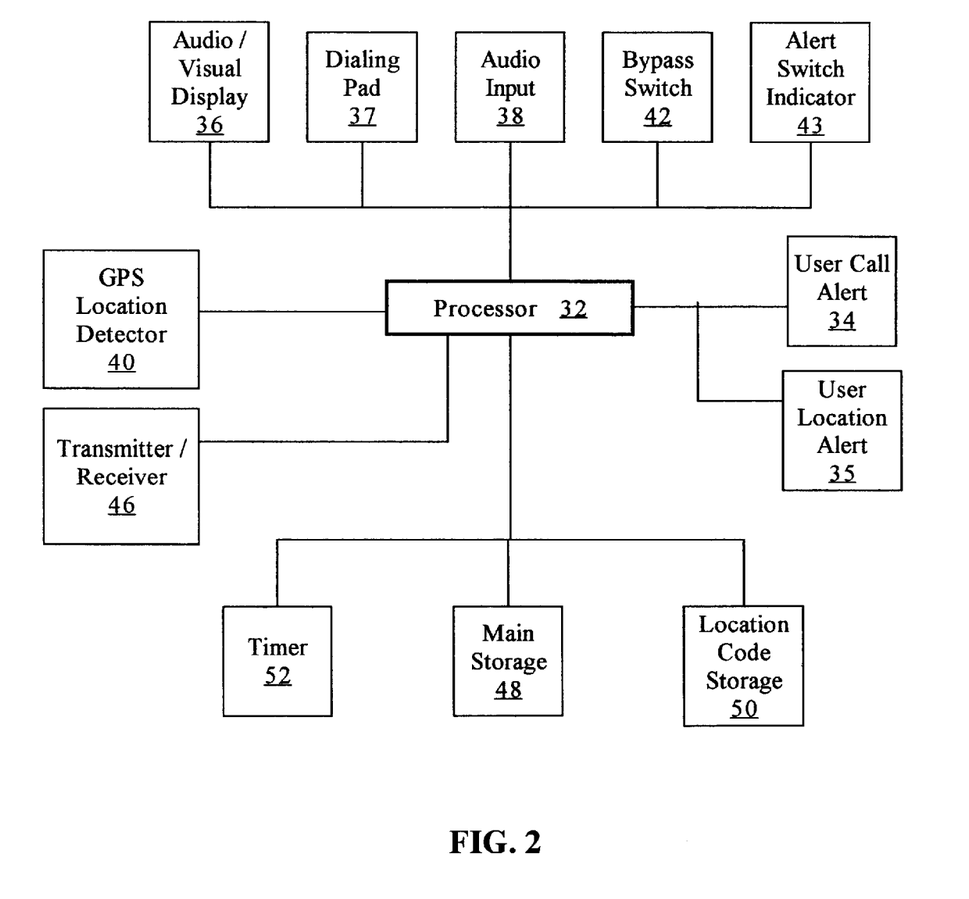
FIG. 2 is a block diagram illustrating the components of a mobile telephone of the present invention, such as the portable telephone of FIG. 1.

Referring to FIG. 2, a schematic of the components of portable telephone 28 is provided. Most of the functions of portable telephone 32 are executed by processor 32. Processor 32 is a digital microprocessor suitably programmed to execute the methods performed by portable telephone 32 as described herein. However, it will be appreciated throughout this application that processor 32 or any hardware or software described in any of the components of the present application, includes any fuinctionally equivalent hardware and/or software to perform the necessary functions. Processor 32 uses a main storage 48 in which the necessary programming code is stored and for purposes described below. Main storage 48 and any other storage device, can be a magnetic or optical disk drive, but is preferably a solid state storage device. A location code storage 50, which may or may not be the same device as main storage 48, stores the data identifying a received sequence of alphanumeric characters as a location request signal. A timer 52 provides a timing signal to processor 32 to obtain the necessary timing functions described herein. Portable telephone 28 further includes a transmitter/receiver combination ("transceiver") 46 connected to antenna 30.

As mentioned, portable telephone 28 includes a GPS location detector 40. GPS location detector 40 uses signals from any series of positioning satellites, to ascertain the geographical location of portable telephone, 28, and generates a corresponding location signal for transmission.

Figure 3:
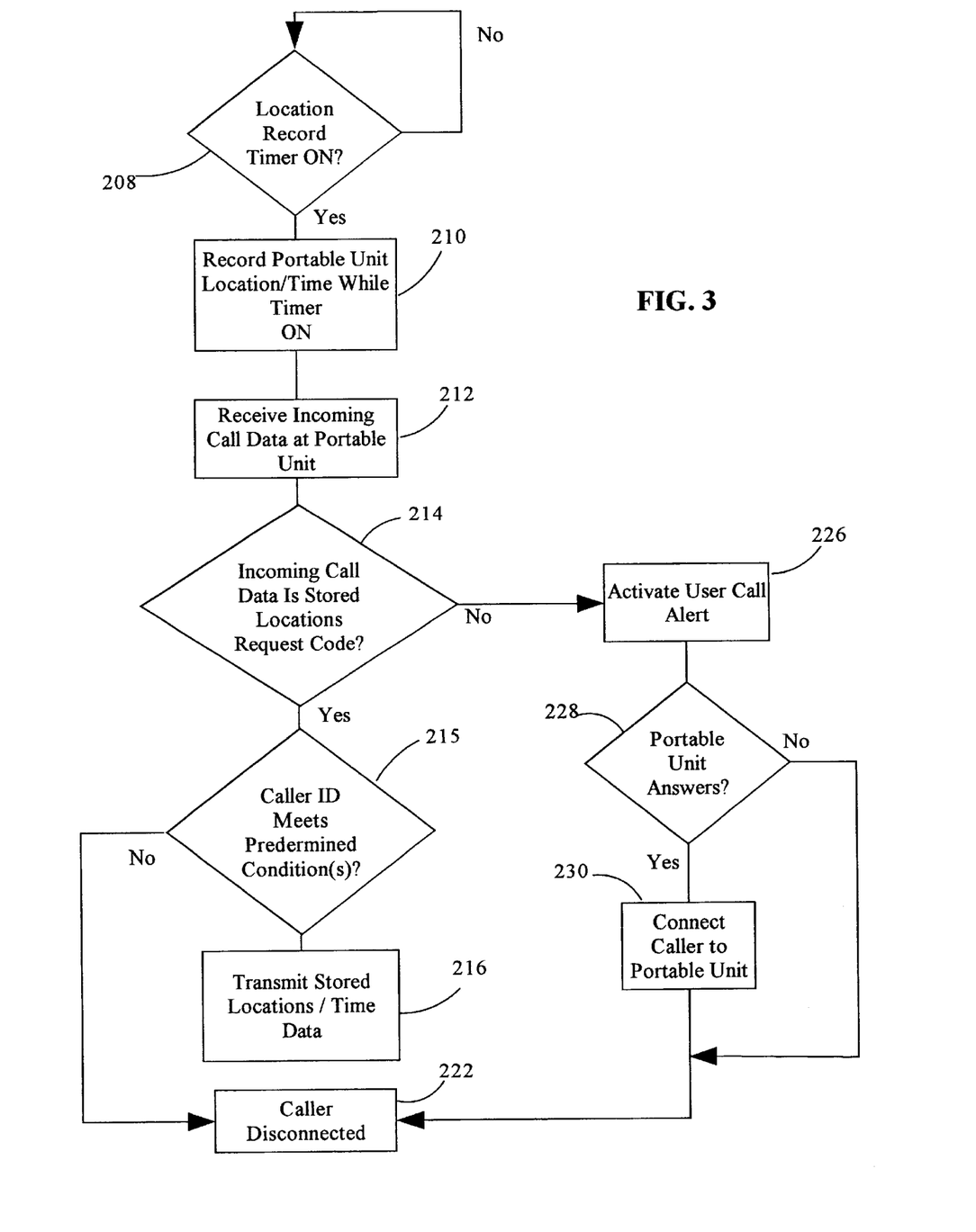
FIG. 3 is a flowchart illustrating a method of the present invention, as might be executed by a mobile telephone such as that of FIG. 2.

The operation of the portable unit 28 of FIGS. 1 and 2 will now be described, particularly with reference to the flowchart of FIG. 3. Following that, the operation of the base station 17 will next be described particularly in connection with FIG. 4.

First, it will be assumed that processor 32 is programmed with a predetermined rule as to when locations of the mobile unit 28 are to be saved. For example, such a predetermined rule may indicate that locations of the portable unit 28 are to be recorded every 10 minutes over the period of 7 AM to 7 PM, Monday to Friday. The predetermined rule could be input by a user of the portable unit 28 using the user interface, or could be input from remote base station 17 when received at transceiver 46, or some combination of the foregoing could be used (for example, base station 17 requests portable unit to record locations every 10 minutes every day, but this is modified to be restricted to the foregoing time span and dates by a user using user the user interface. Any type of access, whether from a user or a remote base 17, to program processor 32 could be required by processor 32 to be preceded by correct entry of a predetermined code saved in memory 48. It will also be appreciated that other location recording rules could be used, for example such rules rather than being based on preselected times, as in the foregoing case, could be based on preselected location variations. Such preselected location variation rules could be, for example, to record the location of portable unit 28 whenever the location has changed by more than a predetermined amount (such as one mile) or record the location whenever portable unit 28 travels within or without a predefined location (such as whenever unit 28 comes within a predetermined distance of a particular location).

Figure 4:
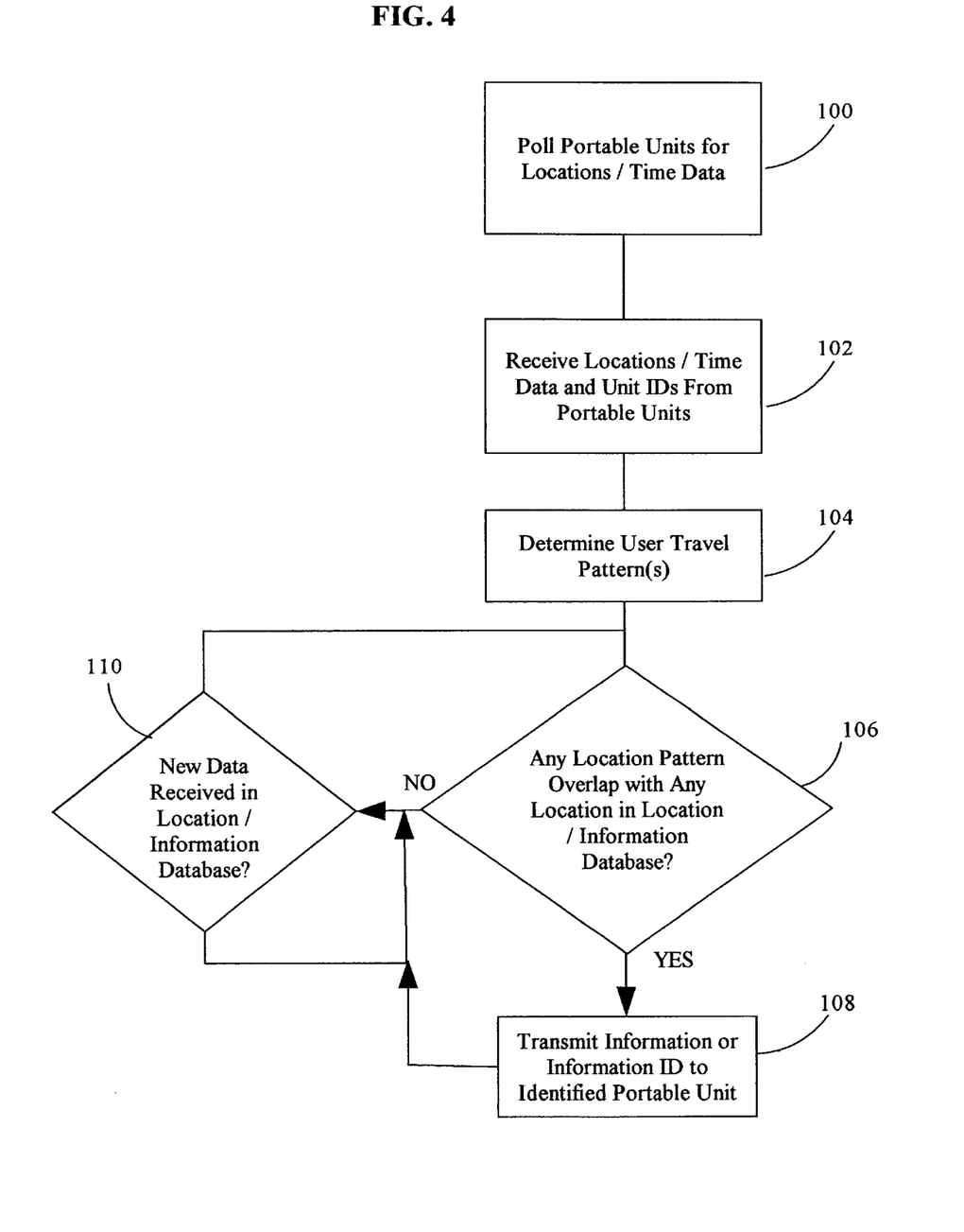
FIG. 4 is a flowchart illustrating a method of the present invention such as might be executed by a base station such as that of FIG. 1.

Referring to FIG. 4, when processor 32 indicates that location of mobile unit 28 should not be recorded, that is location record timer is not ON, then the program loops until processor 32 determines (208) that the location of portable unit 28 should now be determined repeatedly (210) in accordance with the predetermined rule. The locations of portable unit are determined from GPS location detector 40 and stored in memory 50. Note that the stored locations are preferably, but not necessarily, stored in association with respective times (that is, the each of the multiple locations is stored in association with a corresponding time at which mobile unit 28 was at that location). Such recordation continues only when the rule indicates locations should be recorded. When an incoming call is received through transceiver 46, processor 32 determines (214) if the incoming call (sometimes referenced as incoming call data) carries a stored locations request code. Such a stored locations request code can be any predetermined data, such as a received "**". If no stored location request code is carried by an incoming call, processor 32 treats the incoming call as one requesting communication with the user and activates (226) user call alert 34. If the portable unit is answered by a user (228) processor 32 connects the incoming call (230) to the user interface for the user to communicate with the caller. When the user is finished communicating with the caller (by indicating on the user interface a desire to "hang up") or if the user did not indicate on the user interface a desire to "answer" the call (that is, indicate that she wishes to engage in communication with the caller), the caller is disconnected (222). If a stored locations access code is found, processor 32 does not activate user call alert 34 but instead checks (215) if the request also meets at least one predetermined requirement, such as carrying an identification corresponding to a preselected identification (sometimes referenced herein as a "stored location access code") previously stored in memory 50 by a user using the user interface, or by a remote base station 17 through transceiver 46. The stored location access code may simply be a matching the caller ID of base station 17 (as illustrated in FIG. 4) and/or some other code. If the request meets the predetermined requirement, then multiple location and time data previously stored in memory 48 is transmitted (216) to base station 17 in association with an identification of the mobile unit 28 (which is previously saved in memory 48). Processor 32 can then delete such transmitted information from memory 48.

Alternatively to the above, processor 32 may be programmed to transmit location data as it is obtained from GPS location detector 40, in accordance with a predetermined rule. For example, if location data is to be obtained every 10 minutes or at preselected location variations, rather than saving such location data, it may be transmitted as it is collected over a preselected time period (which again may be entered into processor 32 through the user interface or from a remote base station). Alternatively, where the location data is saved in accordance with the predetermined rule, the rule may provide for regular times at which it is to be transmitted to base station 17, rather than waiting for an incoming location request from base station 17.

Turning now to base station 17, it is assumed that merchants interested in obtaining the services of base station 17 have already communicated promotional information on their business in association with its location, from remote merchant computer 10. The communicated promotional information may or may not include a time feature. For example, such promotional information may include a special price to be offered on a product at the business, but only on certain times on certain dates (for example, coffee will be on sale for 25 cents but only between 8 AM and 9 AM, Monday to Friday). The location information from the merchant computer 10 is saved in database 22 in directly in association with the promotional information. Alternatively, the promotional information may be referenced indirectly only, by saving an identification of such information (a "promotional identification") in association with the business location. Multiple such location and promotional informations (or identifications) can be saved in database 22.

Base station 17 then calls (100) each of multiple mobile units 28 and accesses stored location and time information, or the such information is provided to base station 17 in any other manner, as previously described. This information is received (102) and stored, for each mobile unit, in database 23 in association with an identification of that unit. Furthermore, database 23 may contain one or more predefined locations associated with mobile unit 28 (either generally, or with one or more different users of a mobile unit 28). Such a location may be either the mobile unit itself, or another location such as a user's home address. The predefined locations indicate where promotional identifications or information may or should be sent, and can be established at the time a customer previously agrees to enroll in the services provided by base station 17. Also at such time, the customer may optionally indicated preferences or requirements of information categories she wishes to receive or not receive, and this can also be stored in memory 23.

Figure 5:
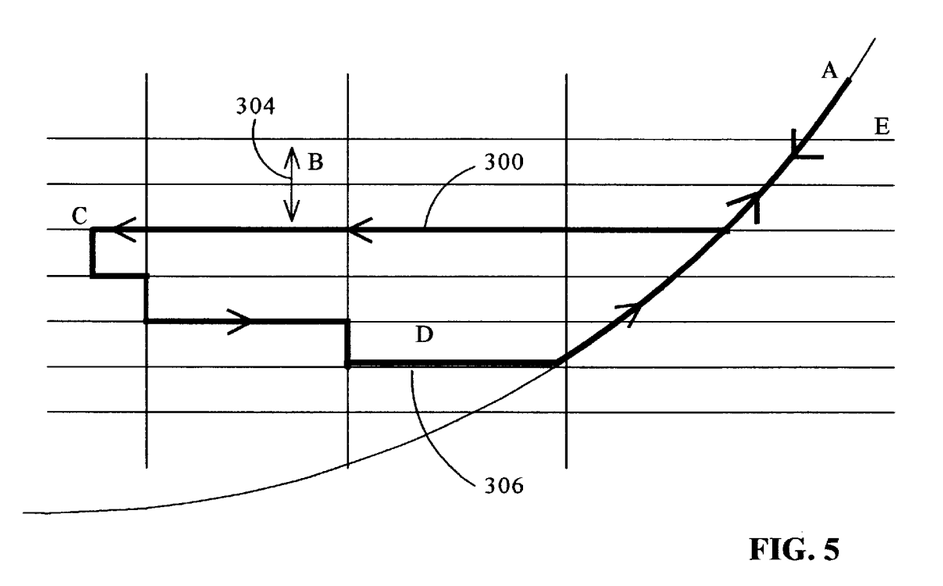
FIG. 5 illustrates a determined travel pattern of a mobile unit and the use of such travel pattern to provide geographically relevant promotional information to a user.

Once sufficient location and time information has been received and stored in database 23 for a given mobile unit 28, processor 32 then retrieves such information from database 23 and determines (104) one or more user repeated travel patterns which may optionally be coordinated with a time feature (such as a time range). Alternatively, the user location and corresponding time data could be printed out by processor 32 and a human determination of a travel pattern made. However, for speed and cost of execution, it is preferred that processor 32 does this. For example, referring to FIG. 5, processor 32 has determined that each weekday morning at about 8:30 AM the mobile unit leaves a home address "A" and arrives at work "C" at 8:45 AM by traveling along route 300 which is ten miles long. Home and work addresses "A" and "C" can be provided by a user when enrolling for the services. Similarly, at each weekday evening at about 5:00 PM the mobile unit leaves work address "C" and returns to home address "A" at 5:20 PM by return route 306 which is twelve miles long. Such determined repeated patterns for each mobile unit are stored in database 24 along with identifications of respective mobile units. Processor 32 then uses such a pattern in database 24 to retrieve from database 22, a promotional identification or promotional information which is associated with a predetermined rule related to such travel pattern. Such rule can be established by an operator of station 17 or previously communicated by a merchant in association with the location and promotion information. Such rule may particularly be a predetermined position relative to the repeated travel pattern. Such a predetermined relative position can be based on any rule provided by an operator of a base station 17 or previously by a merchant along with the promotional information and associated merchant location, and stored in database 22. For example, a merchant at remote merchant computer 10 with a location "B" (sometimes referenced as "merchant B") indicated in FIG. 5, may have indicated that it is interested in having its "coffee on sale" special mentioned above, provided only to mobile units that pass within a predetermined position relative to "B" (for example, a predetermined distance such as one mile). Thus, processor 32 will retrieve the promotional identification or information stored in association with merchant "B" and provide that by transmitting it to the mobile unit associated with the repeated pattern in FIG. 5, since that mobile unit passes within the predetermined position relative to "B" (that is, passes within one mile of merchant "B"). Alternatively, a printed copy could be delivered to the user's address. Note that when the promotional identification or information is provided to the mobile unit, it can be provided as legible data to be viewed on a display 36a of the portable unit, or voice synthesizer 19 can transmit a voice synthesized rendition of the identification or information for listening on earphone 36b.

The predetermined rule for selecting which promotional information or identification to provide, can additionally or alternatively be based on a time feature (such as an overlap) of the determined travel pattern and the time feature associated with the promotional identification. That is, the two time features may be required by the rule to overlap, or they may be required to match, or be different in some specified way. For example, in the "coffee on sale" situation by the merchant B, in addition to the location requirement the promotional identification may be associated with a time requirement that the "coffee on sale" information is only to be provided to mobile units which are passing within the previously specified one mile between 8:00 AM and 9:00 AM. In the case of the mobile unit with the pattern in FIG. 5 previously discussed, such "coffee on sale" at merchant B location will be transmitted to that mobile unit since that unit passes within one mile of merchant B at some time between 8:30 AM and 8:45 AM on the way to the user's work, each weekday morning. Note that such transmission can occur at any desired time and may particularly occur at only at time within the time feature (in the foregoing example, only between 8:00 AM and 9:00 AM), for example at an overlap of the time feature associated with the promotional information and a time feature associated with the repeated travel pattern (in the foregoing example, only between 8:30 AM and 8:45 AM).

Note that the location associated with a promotional identification or information, may be a negative location limitation. For example, the mobile unit is "not at residence A" is such a negative location limitation. This particular negative location limitation is a location which is within a predetermined position relative to the repeated travel pattern when the portable unit is at any position other than residence A. Also, the time feature overlap described above can be used by itself. For example, a merchant of security systems may have its promotional information on security systems associated with a rule that such information should be provided to a portable unit users which is routinely away from its associated residence (such as residence A in FIG. 5) between 9 AM and 5 PM on weekdays. Thus, such information may be provided to the mobile unit or residence A in the example associated with FIG. 5. This may particularly be transmitted to the mobile unit when a time feature of the repeated pattern overlaps with a time feature associated with the promotional identification or information (such as the closest known time to when the mobile unit leaves residence A).

Station 17 can perform additional desired functions. For example, it may maintain user account information in one of the databases and credit an account associated with the identification of the portable unit based on having received location information from the portable unit. In particular, the amount credited can increase in accordance with the amount of location information received from the portable unit, or which the user authorizes to be received from the portable unit (such as by setting the predetermined time range over which such information can be obtained, as described above). In this manner, the cost of operating a mobile unit can be paid in whole or in part by merchants which pay the operator of base station 17 to provide their promotional information or identification to particular users as described herein. The more location information provided to base station 17 by a portable unit, the more accurate and complete the determination of the repeated travel patterns becomes and hence more correctly targeted promotional information can be provided to a user.

As to the promotional identifications mentioned above, these may for example be some arbitrary reference identification. In this case, the user can be provided with that identification along with an instruction stating to contact a predefined location (such as by phoning a given number) for the promotional information on a "special offer available to you" either now or at the specified time feature associated with the information. As mentioned, rather than such promotional identification, the promotional information (such as "twenty five cent coffee available at merchant B between 8:00 AM and 9 AM weekday mornings") may itself be directly provided to the user (such as by transmitting it from base station 17 to the mobile unit). Alternatively, as already mentioned such promotional identification or information can be printed out and delivered to user address "A" for later consideration. Further, other ways of providing such promotional identification or information are possible. For example, an e-mail may be delivered to a previously established e-mail account associated with the mobile unit at the time a user sets up her account for the services provided by base station 17. Also, it will also be appreciated that the rule on which a particular promotional identification or information may be provided can include other requirements. For example, the type of service/product being offered may also be a factor which can be used to create and/or modify the rule by which the associated promotional identification or information is provided to a mobile unit.

From the above discussion, it will be noted that whenever access is desired to location information on a portable unit (whether in the present invention or in connection with the devices and methods of U.S. application Ser. No. 08/902,090), the present invention provides a means by which this can be limited to only those received location request signals which meet the at least one predetermined criterion (such as carrying the location access code). Thus, while U.S. application Ser. No. 08/902,090 provided a means by which allowance to access such information could be turned on or off, the present invention allows such turning on or off to be selective (such that only predetermined callers will have access to such information). In particular, in the present invention the bypass switch 42 of the mobile unit described in that application becomes a programmable selective bypass switch. Alternatively, as mentioned above, the selective screening can be accomplished at some other remote location which is provided with the predetermined criteria (such as selected caller IDs) transmitted from, for example, the portable unit itself Further variations and modifications to the above described embodiments are, of course, possible. Accordingly, the present invention is not limited to the embodiments described above.

What is claimed is:

1. A method of providing geographically sensitive promotional information to a predefined location associated with a mobile unit having a transmitter which can transmit position location information, the method comprising:

(a) receiving from the mobile unit, at least one transmission which provides information on multiple locations of the mobile unit over a span of time, and an identification of the mobile unit;

(b) determining multiple locations of the mobile unit from the received transmissions, and determining a repeated travel pattern of the mobile unit based on the multiple locations;

(c) retrieving from a database of locations associated with respective promotional identifications, a promotional identification which is associated with a location which is within a predetermined position relative to the repeated travel pattern; and (d) providing the promotional identification or promotion information based on the promotional identification, to the location.

2. A method according to claim 1 wherein the received transmissions from the mobile unit carry location information from a position locator carried by the mobile unit.

3. A method according to claim 1 wherein the predefined location is a fixed location, and the promotional identification or information is physically transported to the predefined location.

4. A method according to claim 1 wherein the mobile unit also has a receiver, the predefined location is the location of the mobile unit, and wherein the promotional identification or information is transmitted to the mobile unit.

5. A method according to claim 4 wherein the promotional identification or information is provided to the mobile unit in response to received location information transmission indicating the mobile unit is within a predetermined position relative to the location associated with the promotional identification.

6. A method according to claim 4 additionally comprising, after determining the repeated travel pattern:

(e) receiving from the mobile unit, further multiple location information transmissions over a span of time and an identification of the mobile unit; and (f) determining from the received multiple location information, that the mobile unit is repeating the determined travel pattern;

wherein the promotional identification or information is transmitted to the mobile unit after step (f).

7. A method according to claim 1, additionally comprising:

coordinating the travel pattern with respect to time;

and wherein the promotional identification is retrieved additionally based on a time feature of the determined travel pattern.

8. A method according to claim 1, additionally comprising:

coordinating the travel pattern with respect to time; and wherein:

the promotional identifications in the database are also associated with respective time features; and the promotional identification is retrieved additionally based on an overlap of a time feature of the determined travel pattern and the time feature associated with the promotional identification.

9. A method according to claim 1 additionally comprising crediting an account associated with the identification of the mobile unit based on having received location information from the mobile unit.

10. A method of providing geographically relevant promotional information to a user location associated with a mobile unit having a position locator system and a transmitter which can transmit the position location information, the method comprising:

(a) receiving from the mobile unit, multiple location information transmissions over a span of time and an identification of the mobile unit;

(b) determining from the received multiple location information, a repeated travel pattern of the mobile unit based on the received information and a corresponding time feature for at least one portion of the repeated travel pattern;

(c) retrieving from a database of time features associated with respective promotional identifications, a promotional identification which is associated with a time feature which overlaps the determined time feature of the repeated travel pattern; and (d) providing the promotional identification or promotion information based on the promotional identification, to the user location.

11. A method according to claim 10 wherein the promotional identification or information is provided to the user location at a time within the time feature associated with the promotional identification.

12. A method according to claim 10 wherein the mobile unit also has a receiver, and wherein the promotional identification or information is transmitted to the mobile unit.

13. An apparatus for providing geographically relevant promotional information to a predefined location associated with a mobile unit having a position locator system and a transmitter which can transmit position location information, the method comprising:

(a) a receiver to receive from the mobile unit, transmissions over a span of time and an identification of the mobile unit;

(b) a processor which determines multiple locations of the mobile unit from the received transmissions, and determines a repeated travel pattern of the mobile unit based on the multiple locations;

(c) a database of locations associated with respective promotional identifications;

wherein the processor further retrieves a promotional identification which is associated with a location which is within a predetermined position relative to the repeated travel pattern, and provides the promotional identification or promotion information based on the promotional identification, to the predefined location.

14. An apparatus according to claim 13 additionally comprising a printer, and wherein the predefined location is a fixed location and the promotional identification or information is printed by the printer.

15. An apparatus according to claim 13 additionally comprising a transmitter, and wherein the predefined location is the location of the mobile unit and the promotional identification or information is transmitted by the transmitter to the mobile unit.

* * * * *